Patented June 4, 1946

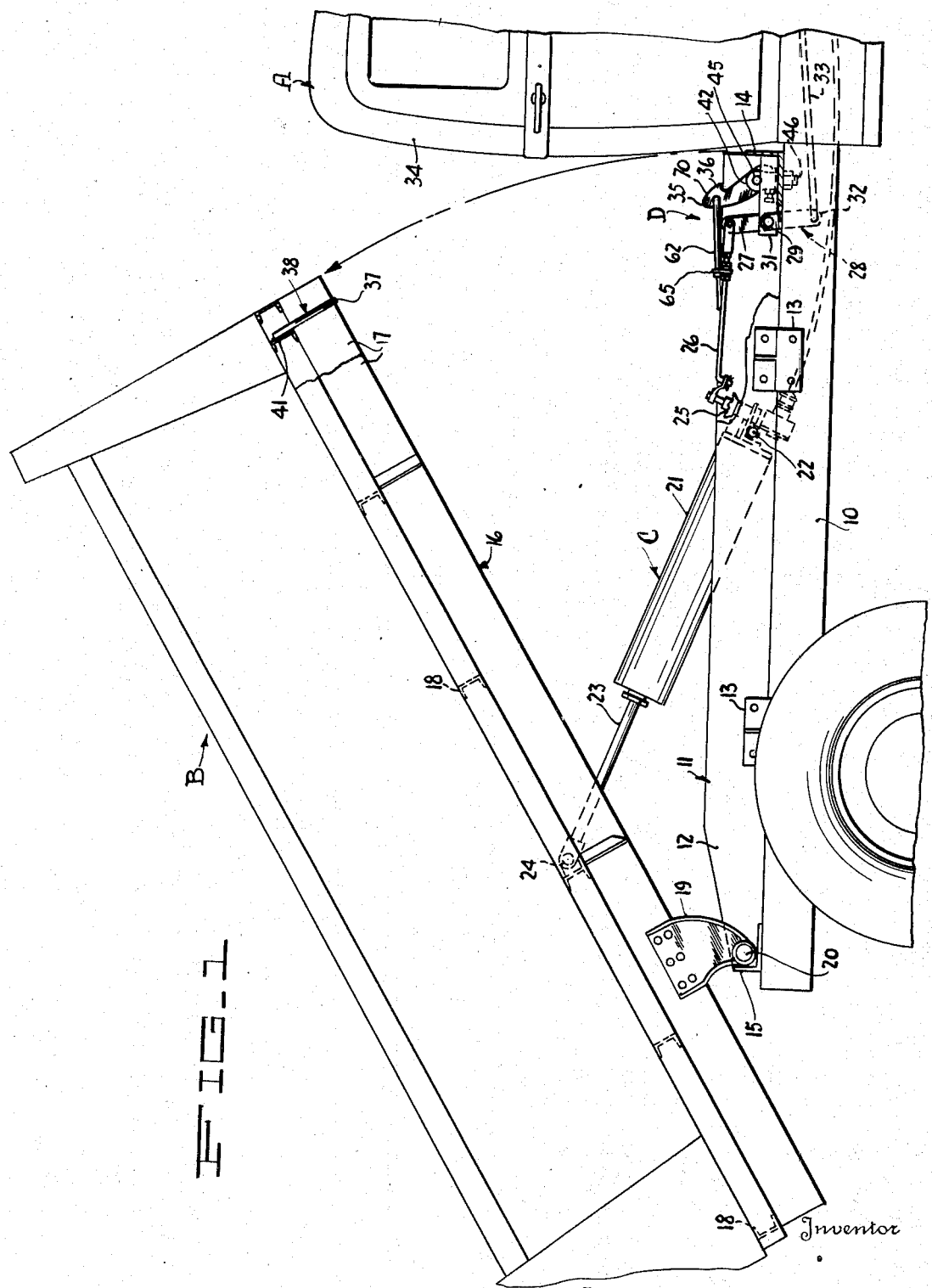

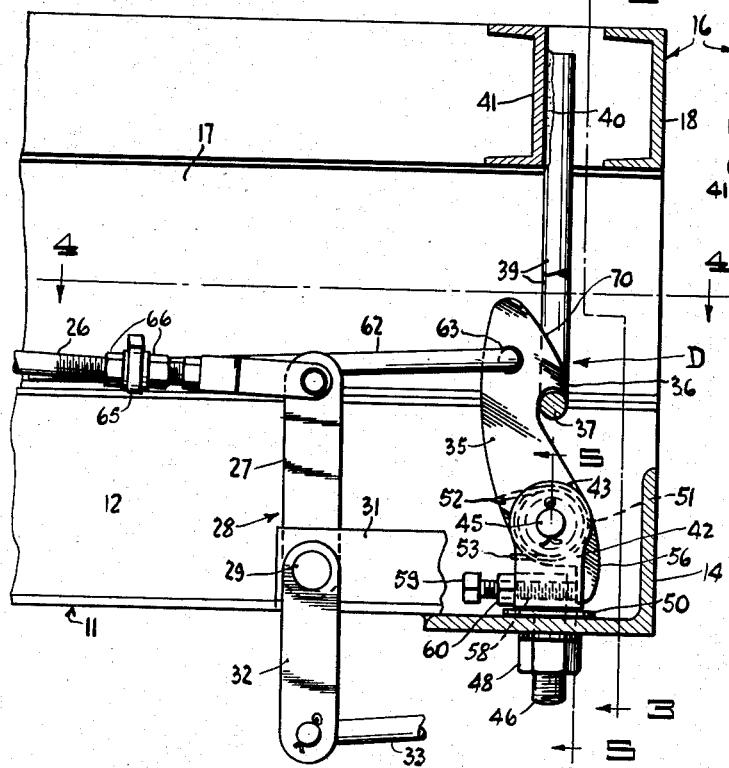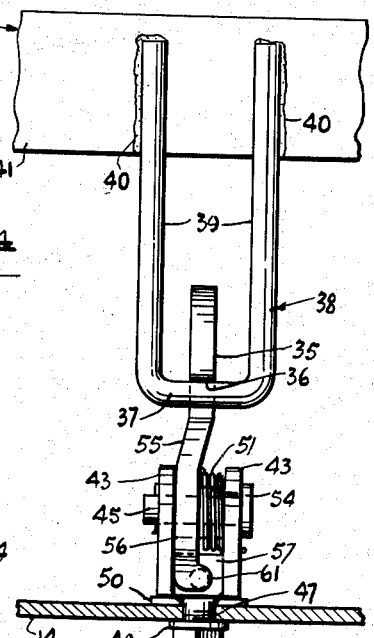

2,401,660

UNITED STATES PATENT OFFICE 2,401,660

LATCH MECHANISM FOR DUMP TRUCKS

Raymond A. Penney, Minneapolis, Minn., assignor to St. Paul Hydraulic Hoist Company, Minneapolis, Minn., a corporation of Michigan

REISSUED
DEC 30 1947

Application December 26, 1944, Serial No. 569,753

12 Claims. (Cl. 298—38)

This invention relates to improvements in latch mechanisms for the bodies of dump trucks.

There is a tendency for the dump bodies of dump trucks to tilt upwardly at their forward ends during transport and this is particularly noticeable where the trucks may be used for transporting cattle or any other type of load which may shift back and forth, and the tendency is particularly noticeable as the truck travels over an inclined road surface. While this tilting tendency may not result in the body actually raising its forward end it does cause wear upon the hoist, the hinge, and other parts of the truck. It is the primary object of my invention, therefore, to provide a mechanical latch mechanism by which the forward end of a dump body may be held down solidly at all times other than when the hydraulic hoist is operated to tilt the body toward dumping position. Another object is to provide a latch mechanism for this purpose which may be readily applied to the truck and when properly adjusted at the outset will operate entirely automatically under the control of the usual hand lever, or levers, used for operating the hoist.

These and other more detailed and specific objects will be disclosed in the course of the following specification, reference being had to the accompanying drawings, in which—

Fig. 1 is a side elevation of a dump truck with parts thereof broken away and in section, showing my improved latch mechanism applied thereto and with the dump body partially raised, the latch being in its released position.

Fig. 2 is an enlarged fragmentary vertical section through a forward part of the body and the associated frames, and showing my latch mechanism in its locked or operative position.

Fig. 3 is a fragmentary vertical section along the line 3—3 in Fig. 2, with latch actuating parts omitted for the sake of clarity.

Fig. 4 is a horizontal section along the line 4—4 in Fig. 2.

Fig. 5 is a fragmentary vertical section along the line 5—5 in Fig. 2, but with all frame parts omitted.

Referring now more particularly and by reference characters to the drawings, A designates generally a dump truck of conventional form upon which is mounted a dump body B which is raised and lowered by a conventional hoist mechanism C. The truck A has the usual chassis 10 upon which is mounted a chassis frame or sub-frame 11 comprising side channels 12, secured by brackets 13 to said frame 10, and joined at their front and rear ends by cross bars 14 and 15, respectively. The dump body B has a body frame or sub-frame 16 which comprises longitudinal beams 17 rigidly connected by cross beams 18 upon which the body is mounted. Adjacent its rear end and some distance therefrom the body frame 16 carries at each side brackets 19 which are pivotally mounted upon a cross shaft 20 supported at the rear end of the frame 11. This connection is so made that the body B may tilt upwardly and rearwardly at its forward end about a transverse pivot axis, and the body normally rests horizontally upon the frame 11 during transport but may obviously be moved to a rearwardly sloping position at which the contents may be dumped from the rear end.

This dumping movement of the body is carried out by the hoist mechanism C and this ordinarily comprises at least one cylinder 21 the forward end of which is pivotally supported and mounted at 22 between the channels 12 of the sub-frame 11 so that the cylinder is braced against forward movement but is permitted to swing in a vertical plane at its rear end. A plunger 23 projects from the rear end of the cylinder 21 and it is pivotally attached at 24 to the body frame 16 forwardly of and above the pivot 20. The arrangement is thus such that the admission of fluid under pressure to the cylinder 21 will cause the plunger 23 to move rearwardly exerting a lifting and rearwardly pushing force upon the body causing it to move toward its dumping position. On the other hand, the plunger 23 may be allowed to move inwardly into the cylinder 21, while fluid is permitted to escape therefrom, so that the body B will return of its own weight toward normal, transport position.

The fluid is permitted to enter the cylinder 21 or to escape therefrom under control of a valve mechanism 25 which is operated by a valve rod 26 connected at its forward end to an arm 27. The valve mechanism 25 is carried at the forward end of the cylinder 21, and the arm 27 forms a part of a relay, indicated generally at 28, including a cross shaft which is journaled at the rear ends of supporting bars 30 and 31, welded or otherwise suitably secured to the front cross bar 14 of the sub-frame 11. The arm 27 is attached to one end of the cross shaft 29 and projects upwardly therefrom while another arm 32 is secured to the opposite end of the shaft 29 and depends therefrom. An operating rod 33 is pivotally connected to the lower end of the arm 32 and extends forwardly therefrom into or beneath the cab 34 of the truck A whereat it is connected to an operating lever (not shown)

convenient to the hand of the driver of the truck. This valve operating mechanism is wholly conventional and the arrangement is such that the oscillation of the shaft 29 will move the upper end of the arm 27 forwardly and rearwardly and position the valve 25 to admit fluid to the cylinder 21, to hold fluid therein, or to allow the fluid to escape as may be required for proper positioning of the dump body B. The arrangement is further such that fluid is admitted to the cylinder 21 to raise or tilt the body B in response to a rearward movement of the arm 27 and of the valve rod 26.

My present invention comprises a latch mechanism, designated generally at D, by which the forward end of the dump body B is locked in its down or transport position. Said mechanism D comprises a latch 35 having a hook or nose portion 36 adapted to engage the horizontal bight portion 37 of a U-shaped yoke or keeper member 38. The spaced upright legs 39 of this member 38 are secured, in any suitable manner, such as by welds 40, to a cross member 41 attached atop the beam 17 in an appropriate position and in such manner that the keeper member 38 depends from the body and is rigid with respect thereto. The lower end portion of the latch 35 is pivotally attached to a bracket or mounting member 42 which is bifurcated to provide transversely spaced ears 43 apertured at 44 to receive a pin 45 by which said pivotal connection is made. The bracket member 44 has an integral depending and threaded stem or stud 46 and the front frame bar 14 of the chassis sub-frame 11 is apertured, as indicated at 47, to pass this stem 46. A nut 48 and lock washer 49 are provided on the lower end of the stem 46 and when screwed upwardly the nut obviously will rigidly clamp the bracket 42 to said bar 14. A centering washer 50 is provided beneath the bracket 42 and above the bar 14, as clearly indicated.

The latch 35 is thus so mounted that it may swing at its upper end in a longitudinal upright plane and is so positioned that its hook or nose portion 36 may overhang the bight portion 37 of the keeper member 38 to thus securely lock the forward end of the body against upward movement relative to the truck and the frame 11 thereon. The latch 35 is normally urged in the forward direction by a torsional coil spring 51 the ends of which are hooked, as indicated at 52 and 53, around rear edges of the latch and one of the ears 43, respectively. Said spring 51 is positioned around a hub 54 formed at one side of the latch adjacent its lower end and adjacent and above which the latch is offset laterally, as indicated at 55. The upper portion of the latch 35 is thus centered with respect to the keeper member 38 while its lower portion is offset to one side thereof, as clearly indicated at Fig. 3. The lower forward portion of the latch 35 then has a finger portion 56 which is positioned forwardly of the base portion 57 of the bracket 42 and which base portion joins the lower portions of the ears 43. This base portion 57 is provided with a tapped bore 58 extending from front to rear thereof and in this bore is screwed a set screw 59 the forward end of which is adapted to engage and limit rearward movement of the finger portion 56 of the latch. Thus the forward movement of the latch 35 its upper end, responsive to the spring 51, may be limited and adjusted by means of the set screw 59 so that the hook or nose portion 36 of the latch may be properly positioned with respect to the keeper member 38. When once made, this adjustment is locked by the lock nut 60 and thereafter the latch 35 may swing only in a rearward direction from its operative position, as indicated in Fig. 2.

The lower extremity of the finger portion 56 of the latch is laterally offset in a direction opposite to the offset 55 as indicated at 61, in order to bring it directly into alignment with the forward end of the set screw 59.

The latch 35 is automatically operated responsive to the movement of the valve rod 26 by means of an actuating rod 62 having its forward end pivotally attached, as indicated at 63, to the upper end of the latch. The actuating rod 62 extends from the latch in the rearward direction substantially parallel to the valve rod 26 and projects slidably through an opening 64 formed in the end of a tie link 65 constituting a lost motion connection which connects the rods. Said tie link 65 is rigidly secured by nuts 66 and lock washers 67 to the valve operating rod 26 and from this point the link traverses the space between the rods, as clearly indicated in Fig. 4. The rear portion of the actuating rod 62 is threaded to receive a pair of nuts 68 and a lock washer 67 which are positioned rearwardly of the end of the link 65 wherein the opening 64 is located. The arrangement is obviously such that the rearward movement of the valve rod 26 and consequent rearward movement of the link 65 will cause the latter to butt against the nut 68 and bring about a corresponding rearward movement of the actuating rod 62. Such movement will obviously swing the upper end of the latch 35 in a rearward direction.

The upper forward portion of the latch 35 has a forwardly and downwardly sloping cam surface 70 terminating at the hook or nose portion 36 and against which the keeper member 30 may ride to swing the latch 35 back as required to bring the bight portion 37 beneath the hook 36.

While the operation of the mechanism is probably understood from the foregoing, it will be briefly described as follows:

As the initial installation and adjustments are made the link 65 is so positioned upon the valve rod 26 and the nut 68 is so locked on the actuating rod 62 that in the normal or holding position of the valve 25 the end of the link 65 will just lie in rearward contact with the forwardmost nut 68. In making such adjustment the set screw 59 is also adjusted as required to bring the nose portion or hook 36 of the latch 35 properly over the bight portion 37 of the keeper member 38. Once these adjustments are made and locked they may be forgotten and thereafter as the controls are operated to admit fluid to the cylinder 21 the rearward movement of the valve rod 26 in opening the valve will at the very outset move the actuating rod 62 rearwardly or release the latch 35 from the keeper member 38. Thus by the time that fluid action in the cylinder causes the body B to start its upward movement the latch is entirely released so that no jamming or breakage of parts may occur. So long as the valve 25 remains open for admitting fluid to the cylinder 21 the latch 35 remains in a rearwardly swung inoperative position, as shown in Fig. 1, but immediately as the valve 25 is moved to its normal holding position the forward movement of the rod 26 will allow the latch to swing back forwardly under the influence of the spring 51 until it returns to the normal position of Fig. 2. As the body B is now tilted forwardly by movement of the valve 25 to a position for exhausting fluid from the cylinder the forward movement of the rod 26 will cause the link 65 to merely slide forwardly along the rod 62 with a lost motion action so that it has no effect upon the position of the latch. Then as the body approaches its down or transport position the keeper member 38 will cam over the surface 70 of the latch, forcing it rearwardly until the bight portion 37 is below the level of the hook 36 upon which the spring will return the latch to its locked position so that it will hold down the body. It will be apparent from the foregoing that the operation is thus completely and entirely automatic and that the latch can in no circumstances interfere with the normal operation of the dump truck.

In some installations the valve rod 26 may lie to the opposite side of the center of the truck to that shown in Fig. 4 but the application of the latch mechanism may be made in such case with equal facility merely by reversing the lateral direction in which the link 65 extends. The link may further be twisted slightly at its end, as indicated at 71 in Fig. 4, in order to compensate for any differences in the relative angle of the valve rod 26 and actuating rod 62, as shown in Figs. 1, 2, and 4.

It is understood that suitable modifications may be made in the structure as disclosed, provided such modifications come within the spirit and scope of the appended claims.

Having now therefore fully illustrated and described my invention, what I claim to be new and desire to protect by Letters Patent is:

1. In a dump truck having a body, a hoist unit for tilting said body upward at its forward end and a control member movable in one direction for actuating the hoist to tilt the body upward, latch mechanism for normally locking the body against said upward tilting movement, and means responsive to said movement of the control member for releasing said latch mechanism.

2. In a dump truck having a body, a hoist unit operative to move the body upwardly and downwardly at one end and a hoist control member movable in one direction for raising the body and in an opposite direction for lowering the body, a latch mechanism normally locking the body against upward movement, and means responsive to movement of the said control member in the first mentioned direction for releasing said latch mechanism.

3. In a dump truck having a body, a hoist unit operative to move the body upwardly and downwardly at one end and a hoist control member movable in one direction for raising the body and in an opposite direction for lowering the body, a latch mechanism normally locking the body against upward movement, and means responsive to movement of the said control member in the first mentioned direction for releasing said latch mechanism, said means including a lost motion device whereby opposite movement of said control member will have no effect on the latch mechanism.

4. In a dump truck having a dump body and hoist mechanism for raising and lowering one end of the body, said mechanism including a hoist control valve rod movable in one direction for raising the body and movable in an opposite direction for lowering it, a latch normally operative to lock the body against upward movement, an actuating rod for the latch, and means connecting said actuating rod to the valve rod in such manner that movement of the latter in a direction for initiating upward movement of the body will move said latch to an inoperative position.

5. In a dump truck having a dump body and hoist mechanism for raising and lowering one end of the body, said mechanism including a hoist control valve rod movable in one direction for raising the body and movable in an opposite direction for lowering it, a latch normally operative to lock the body against upward movement, an actuating rod for the latch, and means connecting said actuating rod to the valve rod in such manner that movement of the latter in a direction for initiating upward movement of the body will move said latch to an inoperative position, while movement of the valve rod in the opposite direction will have no effect on the actuating rod.

6. In a dump truck having a dump body and hoist mechanism for raising and lowering one end of the body, said mechanism including a hoist control valve rod movable in one direction for raising the body and movable in an opposite direction for lowering it, a latch normally operative to lock the body against upward movement, an actuating rod for the latch, a link connected between the valve and actuating rods, said link being adjustably secured to the valve rod and movable in one direction only with respect to the actuating rod.

7. In a dump truck having a dump body and hoist mechanism for raising and lowering one end of the body, said mechanism including a hoist control valve rod movable in one direction for raising the body and movable in an opposite direction for lowering it, a latch normally operative to lock the body against upward movement, an actuating rod for the latch, a link member extending between the valve and actuating rods and movable with the former, and adjustable stop means on the actuating rod for cooperation with the link member whereby movement of the valve rod for raising the body will move said actuating rod to release the latch.

8. In a dump truck having a dump body and hoist mechanism for raising and lowering one end of the body, said mechanism including a hoist control valve rod movable in one direction for raising the body and movable in an opposite direction for lowering it, a latch normally operative to lock the body against upward movement, an actuating rod for the latch, a link member extending between the valve and actuating rods and movable as a unit with the valve rod, and said link having a lost motion connection with the actuating rod whereby movement of the valve rod in one direction only will operate the actuating rod to move said latch to an inoperative position.

9. In a dump truck having a dump body and hoist mechanism for raising and lowering one end of the body, said mechanism including a hoist control valve rod movable in one direction for raising the body and movable in an opposite direction for lowering it, a latch normally operative to lock the body against upward movement, an actuating rod for the latch, a link member adjustably connected to the valve rod, and stop means adjustable along the actuating rod for engagement by the link member whereby movement of the valve rod in a direction for initiating upward movement of the body will move said latch to a position for releasing the body.

10. In a dump truck having a dump body movable upwardly and downwardly at its forward end and a hoist mechanism for operating the body and said mechanism including a valve rod movable rearwardly to cause the body to raise, a latch mechanism for normally locking the forward end of the body against upward movement, said latch mechanism including a latch swingable rearwardly to release the body, an actuating rod connected to the latch and extending alongside the said valve rod, a link member secured at one end to the valve rod and having an aperture in its other end slidably fitting the actuating rod, and stop means on the actuating rod rearwardly of the link member.

11. In a dump truck having a dump body movable upwardly and downwardly at its forward end and a hoist mechanism for operating the body and said mechanism including a valve rod movable rearwardly to cause the body to raise, a latch mechanism for normally locking the forward end of the body against upward movement, said latch mechanism including a latch swingable rearwardly to release the body, an actuating rod connected to the latch and extending alongside the said valve rod, a link member secured at one end to the valve rod and having an aperture in its other end and slidably fitting the actuating rod, and stop means adjustable forwardly and rearwardly along the actuating rod and positioned rearwardly of the link member whereby rearward movement of the valve rod will draw the latch rearwardly to free the dump body.

12. In a dump truck having a frame and a body supported for upward and downward movements at its forward end with respect to said frame, a U-shaped keeper secured to the body, a bracket member secured to the frame, a latch pivotally mounted at its lower end on said bracket member and having a hook at its upper end for forwardly and downwardly engaging the keeper member responsive to forward swinging movement of the latch, the lower end of the latch having a depending finger portion, and a set screw carried by the bracket member for rearwardly engaging said finger portion and for limiting forward keeper engaging movement of the latch.

RAYMOND A. PENNEY.